United States Patent [19]
Sheffield et al.

[11] Patent Number: 5,809,561
[45] Date of Patent: Sep. 15, 1998

[54] METHOD AND APPARATUS FOR REAL MEMORY PAGE HANDLING FOR CACHE OPTIMIZATION

[75] Inventors: David William Sheffield; Kumar Nallapati; Mark Douglass Rogers, all of Austin, Tex.

[73] Assignee: International Business Machines Corp., Armonk, N.Y.

[21] Appl. No.: 726,975

[22] Filed: Oct. 7, 1996

[51] Int. Cl.⁶ ........................................ G06F 12/00
[52] U.S. Cl. ............. 711/206; 711/170; 711/118; 711/123; 711/203; 711/3
[58] Field of Search ................... 711/170, 206, 711/123, 3, 130, 203, 118

[56] References Cited

U.S. PATENT DOCUMENTS

| | | | |
|---|---|---|---|
| 4,884,197 | 11/1989 | Sachs et al. ........................... | 711/123 |
| 4,899,275 | 2/1990 | Sachs et al. ........................... | 711/3 |
| 4,933,835 | 6/1990 | Sachs et al. ........................... | 711/123 |
| 5,091,846 | 2/1992 | Sachs et al. ........................... | 711/130 |
| 5,230,045 | 7/1993 | Sindhu .................................. | 711/203 |
| 5,708,825 | 1/1998 | Sotomayor ............................ | 711/206 |

*Primary Examiner*—Tod R. Swann
*Assistant Examiner*—Mehdi Namazi
*Attorney, Agent, or Firm*—Duke Yee; Richard A. Hewder

[57] ABSTRACT

An improved method and apparatus for managing real pages, also called physical pages, and virtual pages, also called logical pages, in a virtually indexed cache that is implemented as two physical caches. A list of free real pages that is a doubly linked list with a single anchor in addition to the free real pages is created. The pages are sequentially associated with each other using two sets of pointers. A set of forward pointers are used with the first pointer connecting the anchor page to the first physical page in the list and subsequent pointers connecting subsequent pages with each other with the last page having a pointer pointing to the anchor page. A set of backward pointers are employed with the first pointer pointing from the anchor to the last page in the list with subsequent pointers traversing the list towards the first page with the first page having the last pointer pointing to the anchor page. When a request for a real page is received to assign to a virtual page, an identification of whether the virtual page is an even or odd virtual page is made. The last real page in the list is assigned in response to a determination that the virtual page is an even virtual page. The first real page is assigned in response to a determination that the virtual page is an odd virtual page. In freeing real pages, an identification is made as to whether the page being freed is an even real or an odd real page. The page being freed is inserted at the beginning of the list in response to a determination that the real page is an odd real page. The page being freed is inserted at the end of the list in response to a determination that the page being freed is an even real page.

13 Claims, 9 Drawing Sheets

METHOD AND APPARATUS FOR REAL MEMORY PAGE HANDLING FOR CACHE OPTIMIZATION

BACKGROUND OF THE INVENTION

1. Technical Field

The present invention relates generally to an improved data processing system and in particular to an improved method and apparatus for managing a cache in a data processing system. Still more particularly, the present invention relates to an improved method and apparatus for managing real memory pages in a cache in a data processing system.

2. Description of the Related Art

Most modern data processing systems make use of caches to increase the rate at which they can process information. Generally, a cache is defined as a relatively small amount of relatively fast, expensive memory, which resides between a processor and a relatively large amount of slow, inexpensive memory (main memory). A cache attempts to store those portions of main memory, which will be needed by the processor. When the processor reads information from the main memory, the processor will first check to see if the information can be found in the cache. If the information requested by the processor is located in the cache, the cache simply returns that information to the processor. This type of operation allows the processor to avoid having to access main memory. Since accessing the cache is faster than accessing main memory, the rate at which information is processed by the processor is increased.

Many modern processors use more than one cache to increase performance. One common arrangement is to have one small cache located on the same silicon die as the microprocessor. A cache that is located on the same silicon die, or otherwise very closely associated with a microprocessor is often known as a L1 cache. Another cache, known as the L2 cache, can be placed apart from the microprocessor and the L1 cache. The L2 cache resides between the processor and main memory, and functions in the manner similar to that of the L1 cache. The L2 cache is almost always larger than the L1 cache, but the L2 cache cannot provide information to the processor as quickly as the L1 cache.

Some L1 cache architectures provide a cache that is actually implemented as two different caches. For example, the 604e PowerPC has a 32k virtually indexed cache that is implemented as two 16k caches. "PowerPC" is a trademark of International Business Machines Corportion. Thus, when a cache line is to be replaced, which 16k cache to use is selected by the real page number, not the virtual page number. Thus, odd real pages will be stored in one of these two caches while even real pages will be stored in the other cache. Such a cache architecture provides a problem for operating systems that assign real pages to virtual pages in a random manner. For example, Advance Interactive Executive (AIX), a version of UNIX system provided by International Business Machines Corporation for its UNIX workstations and PCs is an operating system that assigns real pages to virtual pages in a random manner. In such a situation, it is possible for five consecutive virtual 4k pages to not fit into a 32k cache if they were all even or odd pages. This type of situation is most noticeable with applications that are between 16k and 32k in size. Although such an application should fit in the cache to avoid all cache misses, whether it will really fit, however, is dependent on the assignment of real pages to virtual pages. In the worst case, the 32k cache will appear to only be a 16k cache in operation. A real page is 4096 bytes, which result in two 4-page caches when two 16k caches are implemented to form a 32k cache.

Figure 1:
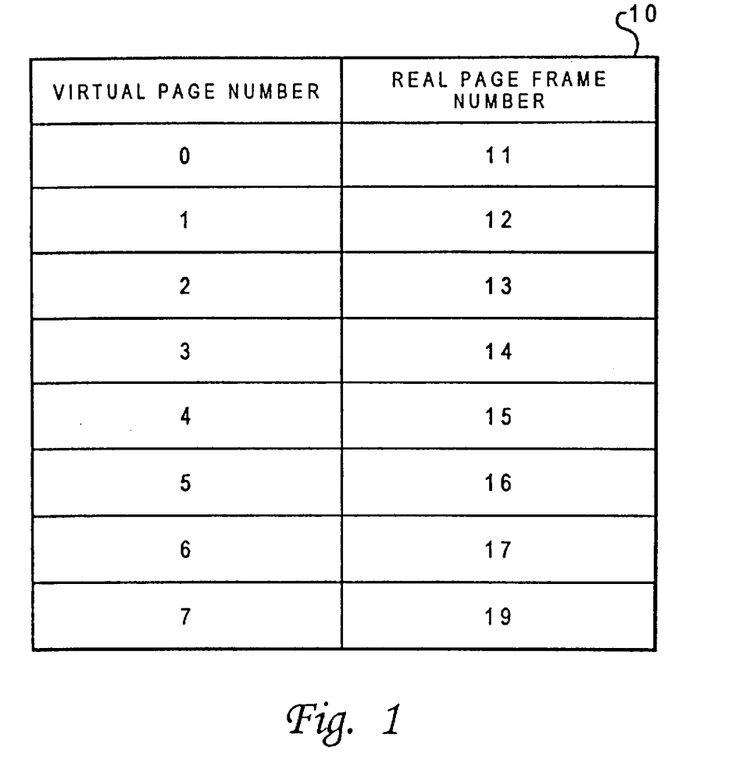
FIG. 1 shows virtual page numbers and a possible association with real page numbers.
Figure 2:
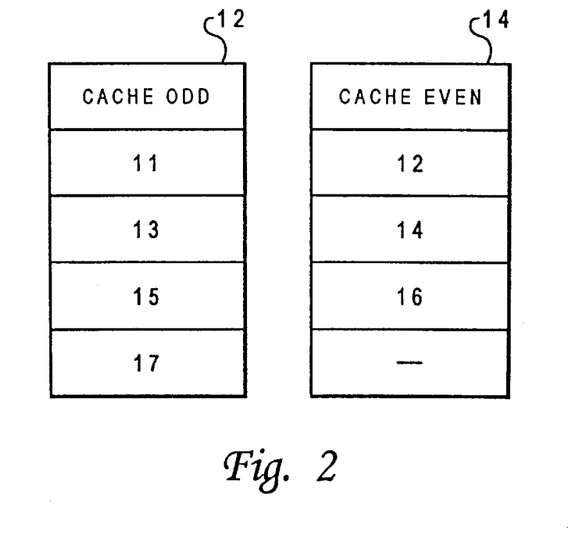
FIG. 2 is a block diagram of a cache.

Table 10 in FIG. 1 shows virtual page numbers and a possible association with real page numbers. In FIG. 2, Cache 12 and cache 14 show how two 4-page caches will fill up assuming a code segment that is executed sequentially from page 0 through page 7. When the code in virtual page 7, which is real page 19, is executed, data will have to be removed from cache 12 because the entire code segment will not fit into the cache. Cache 14, however, remains partially unused. Therefore, cache architectures implementing two physical caches to form a single L1 or L2 cache can result in inefficient cache usage with operating systems that assign real pages to virtual pages in a random fashion. Therefore, it would be advantageous to have an improved method and apparatus for managing real pages in a cache architecture employing two physical caches.

SUMMARY OF THE INVENTION

It is one object of the present invention to provide an improved data processing system.

It is another object of the present invention to provide an improved method and apparatus for managing a cache in a data processing system.

It is yet another object of the present invention to provide an improved method and apparatus for managing real and virtual pages in a cache in a data processing system.

The present invention provides an improved method and apparatus for managing real pages, also called physical pages, and virtual pages, also called logical pages, in a virtually indexed cache that is implemented as two physical caches. The present invention creates a list of free real pages that is a doubly linked list with a single anchor in addition to the free real pages. The pages are sequentially associated with each other using two sets of pointers. A set of forward pointers are used with the first pointer connecting the anchor page to the first real page in the list and subsequent pointers connecting subsequent pages with each other with the last page having a pointer pointing to the anchor page. A set of backward pointers are employed with the first pointer pointing from the anchor to the last page in the list with subsequent pointers traversing the list towards the first page with the first page having the last pointer pointing to the anchor page. When a request for a real page is received to assign to a virtual page, an identification of whether the virtual page is an even or odd virtual page is made. The last real page in the list is assigned in response to a determination that the virtual page is an even virtual page. The first real page is assigned in response to a determination that the virtual page is an odd virtual page. In freeing real pages, an identification is made as to whether the page being freed is an even real or an odd real page. The page being freed is inserted at the beginning of the list in response to a determination that the real page is an odd real page. The page being freed is inserted at the end of the list in response to a determination that the page being freed is an even real page.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 3:
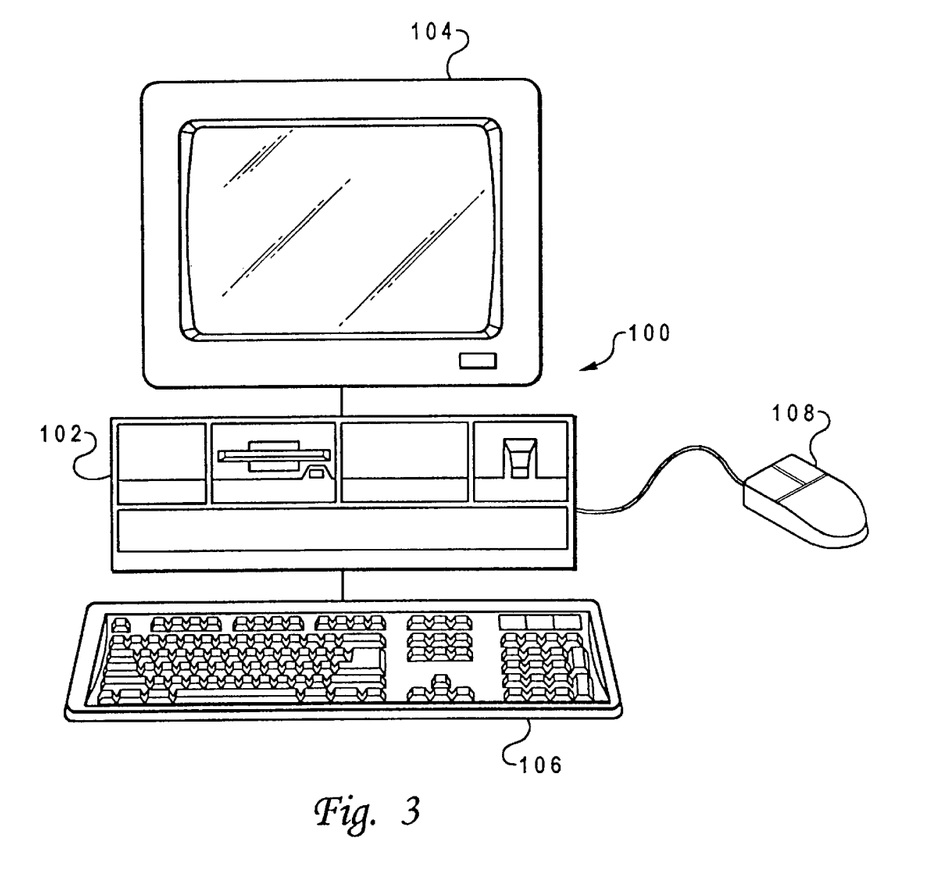
FIG. 3 is a pictorial representation of a data processing system in which the present invention may be implemented in accordance with a preferred embodiment of the present invention.

With reference now to the figures and in particular with reference to FIG. 3, there is depicted a pictorial representation of a data processing system in which the present invention may be implemented in accordance with a preferred embodiment of the present invention. A personal computer 100 is depicted which includes a system unit 102, a video display terminal 104, a keyboard 106, and a mouse 108. Personal computer 100 may be implemented utilizing any suitable computer such as an IBM PC computer or an IBM RISC System/6000 computer, both products of International Business Machines Corporation, located in Armonk, N.Y. RISC System/6000 is a registered trademark of International Business Machines Corporation. Although the depicted embodiment involves a personal computer, a preferred embodiment of the present invention may be implemented in other types of data processing systems, such as for example, intelligent work stations or mini-computers.

Figure 4:
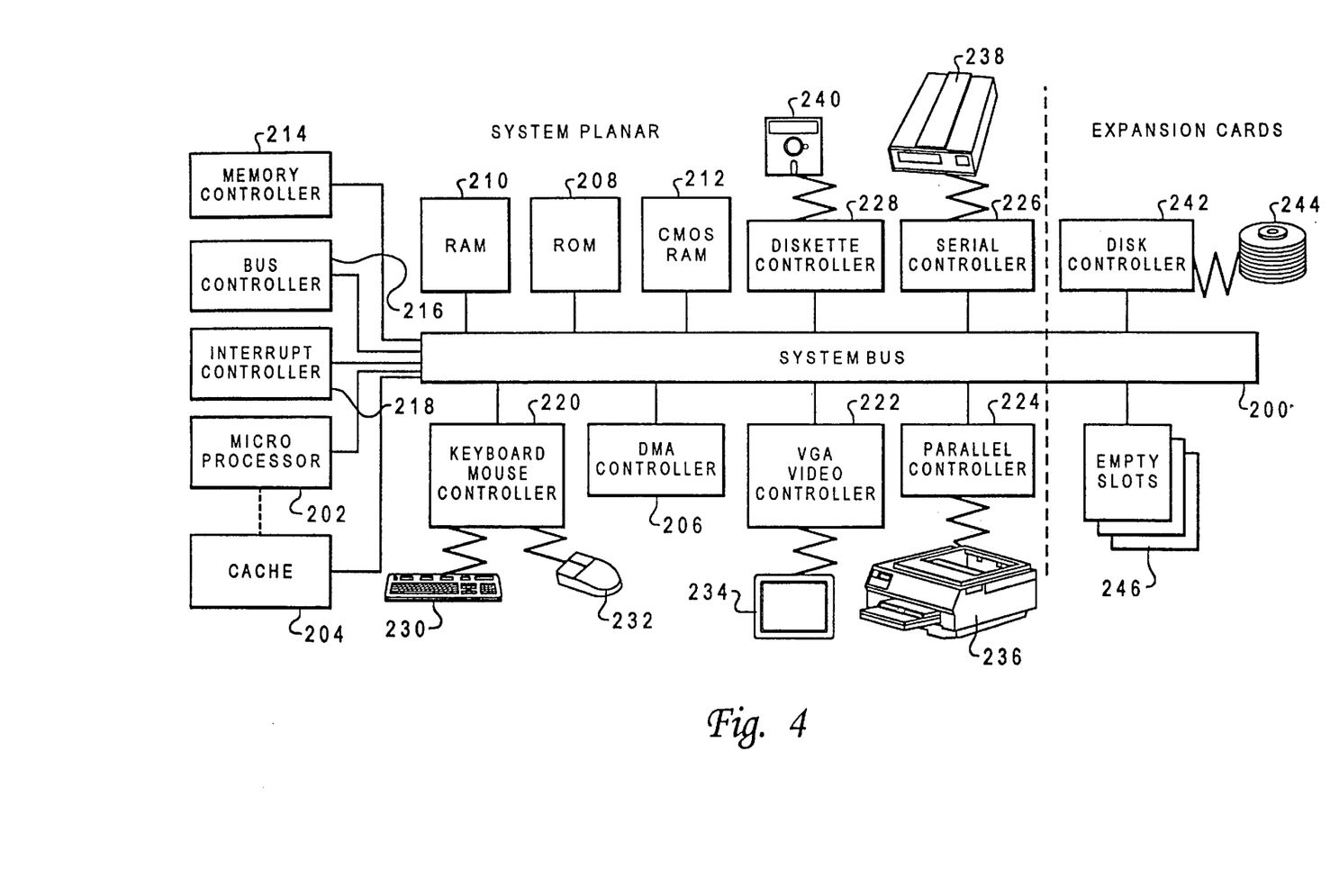
FIG. 4 is a block diagram of selected components in personal computer in which a preferred embodiment of the present invention may be implemented.

Referring now to FIG. 4, there is depicted a block diagram of selected components in personal computer 100 in which a preferred embodiment of the present invention may be implemented. In particular, FIG. 4 shows an implementation in an IBM PC Computer. System unit 102 preferably includes a system bus 200 for interconnecting and establishing communication between various components in system unit 102. Microprocessor 202 is connected to system bus 200, as is cache 204. Direct memory access (DMA) controller 206 is also connected to system bus 200 and allows various devices to appropriate cycles from microprocessor 202 during large I/O transfers.

Read Only Memory (ROM) 208 and Random Access Memory (RAM) 210 are also connected to system bus 200. ROM 208 contains the power-on self test (POST) and the Basic Input/Output System (BIOS) which control hardware operations, such as those involving disk drives and the keyboard. Read only memory (ROM) 208 is mapped into the microprocessor 202 address space in the range from 640K to 32 megabyte. CMOS RAM 212 is attached to system bus 200 and contains system configuration information.

Also connected to system bus 200 are memory controller 214, bus controller 216, and interrupt controller 218 which serve to aid in the control of data flow through system bus 200 between various peripherals, adapters, and devices. System unit 102 also contains various input/output (I/O) controllers such as: keyboard and mouse controller 220, video controller 222, parallel controller 224, serial controller 226, and diskette controller 228. Keyboard and mouse controller 220 provide a hardware interface for keyboard 230 and mouse 232. Video controller 222 provides a hardware interface for video display terminal 234. Parallel controller 224 provides a hardware interface for devices such as printer 236. Serial controller 226 provides a hardware interface for devices such as a modem 238. Diskette controller 228 provides a hardware interface for floppy disk unit 240. Expansion cards also may be added to system bus 200, such as disk controller 242, which provides a hardware interface for hard disk unit 244. Empty slots 246 are provided so that other peripherals, adapters, and devices may be added to system unit 102.

Those skilled in the art will appreciate that the hardware depicted in FIG. 2 may vary for specific applications. For example, other peripheral devices such as: optical disk drive, an audio adapter, high resolution graphics adapter, and the like may also be utilized in addition to or in place of the hardware already depicted.

Figure 5A:
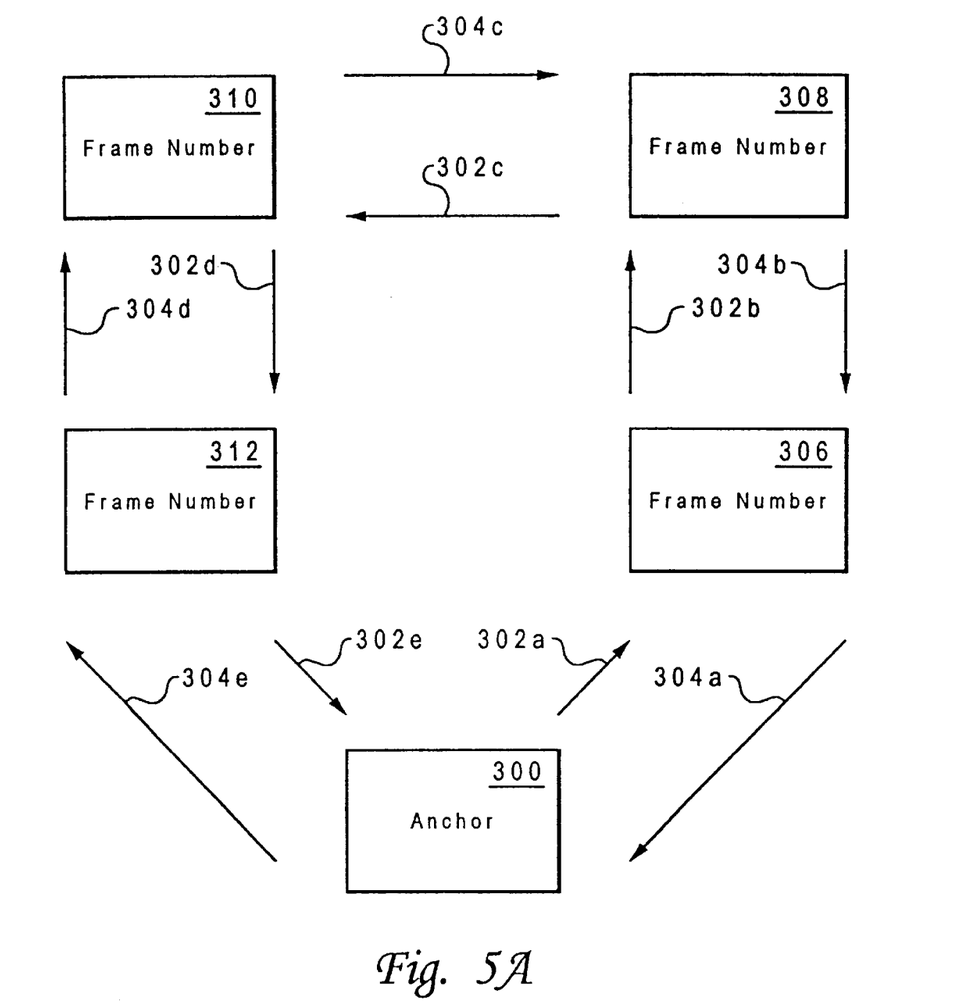
FIGS. 5A–5C are diagrams illustrating the insertion of pages on a free list using an anchor are depicted in accordance with a preferred embodiment of the present invention.
Figure 5B:
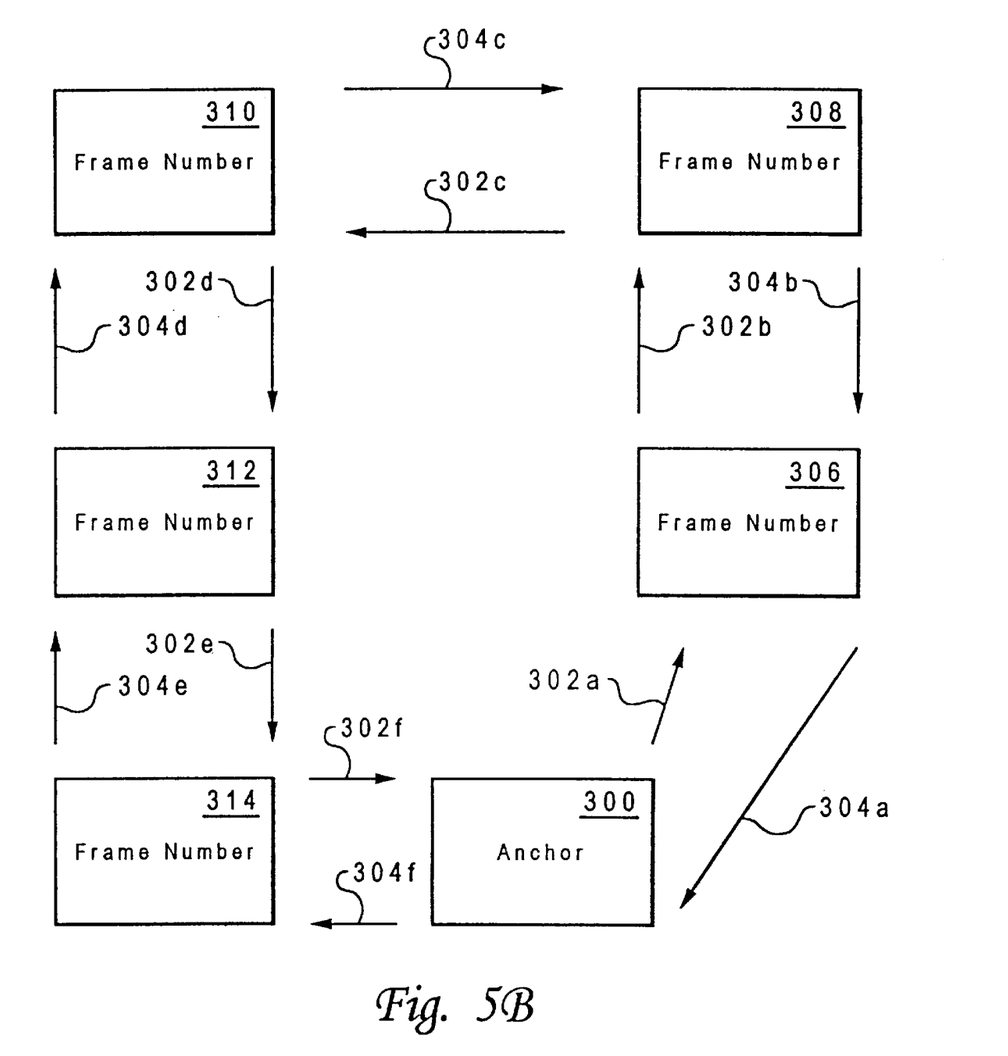
Figure 5C:
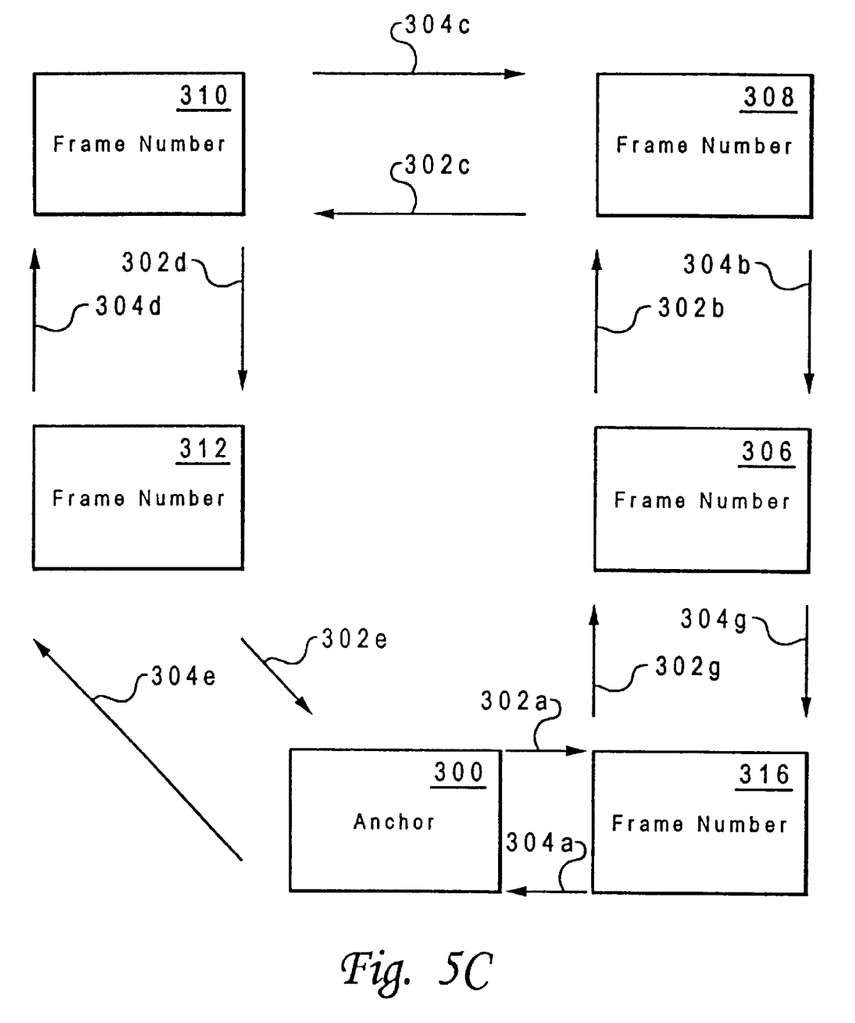

With reference now to FIGS. 5A–5C, diagrams illustrating the insertion of real pages on a free list using an anchor are depicted in accordance with a preferred embodiment of the present invention. The present invention provides a mechanism to optimize cache usage by assigning odd real pages to odd virtual pages and even real pages to even virtual pages. As a result, two consecutive virtual pages will be assigned to opposite caches. In FIG. 5A, a doubly linked list with an anchor 300 is employed in accordance with a preferred embodiment of the present invention. Anchor 300 is always present even if the list is empty. Forward pointers 302a–302e are employed with backward pointers 304a–304e to link page numbers 306–312 to each other and to anchor 300 to form a doubly linked list. In FIG. 5B, the insertion of even page number 314 results in forward pointer 302e being pointed to even page number 314 from page number 312 and backward pointer 304e pointing from even page number 314 to page number 312. A forward pointer 302f is added to point from even page number 314 to anchor 300 and a backward pointer 304f is added to point anchor 300 to even page number 314. When an odd page number, such as odd page number 316 is added to the link list in FIG. 5B, forward pointer 302a is changed to point to the new odd page number 316 and backward pointer 304a is altered to point from odd page number 316 to anchor page 300. A new forward pointer 302g and a new backward pointer 304g are employed to provide connections between odd page 316 and page number 306.

Even pages are inserted behind the anchor at the end of the link list while odd pages are inserted before anchor 300 at the head of the doubly link list. As a result, the list is always divided with the anchor as the divider and in effect presents a two-way list in accordance with a preferred embodiment of the present invention.

Figure 6A:
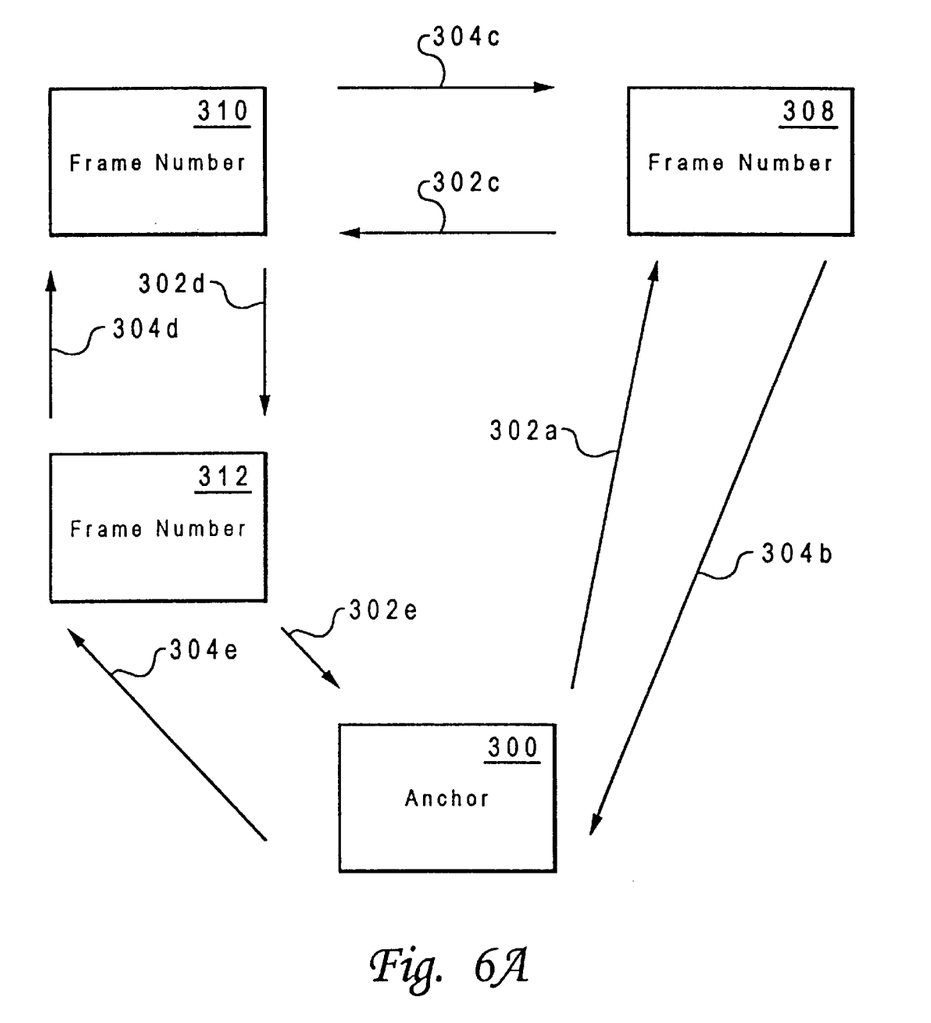
FIGS. 6A and 6B are diagrams illustrating the removal of page numbers from a free list using an anchor in accordance with a preferred embodiment of the present invention.
Figure 6B:
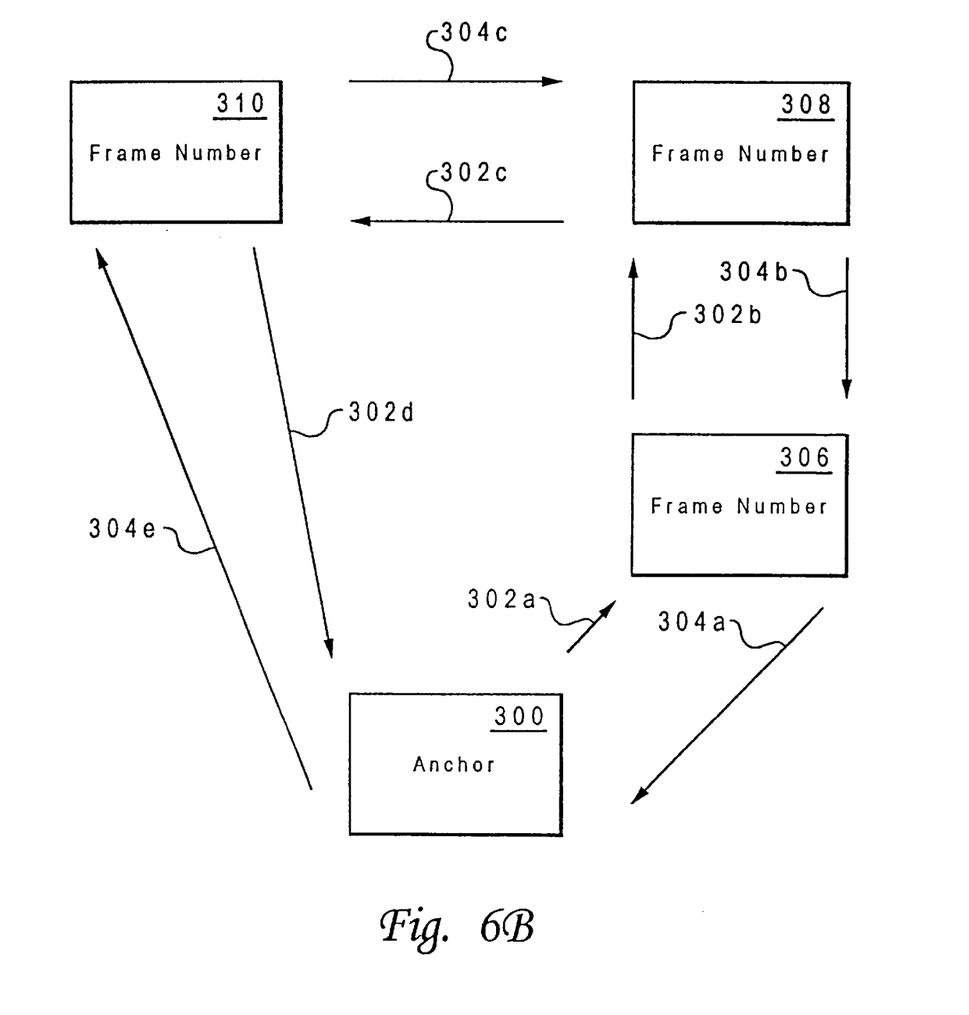

FIGS. 6A and 6B are diagrams illustrating the removal of page numbers from a free list using an anchor in accordance with a preferred embodiment of the present invention. When pages are to be allocated, a page is taken either from the head or tail of the list depending on whether an even or odd page is needed. If an odd page is needed, but one is not available, an even page from the tail of the list will be used. Such an allocation helps provide for cache optimization while avoiding forcing page replacement to obtain an odd page when an even page is available.

The present invention provides an improved method and apparatus for optimizing cache usage in a data processing system. The present invention provides the advantage of eliminating traversing a list to find the right type of page. A real page is provided as long as one is present on the list. The depicted list is easily scaled by using an additional anchor for each two-way increment. In other words, the present invention can be applied to other types of caches, for example, a cache that is split into four physical caches. In such a case, two separate anchors, each with forward and backward pointers would be employed in accordance with preferred embodiments of the present invention. The process would key off one bit within the virtual page number to select which anchor and another bit to select the forward or backward pointer when allocating from the free list to assign a real page to a virtual page.

The present invention provides an improved mechanism for checking for even or odd pages when inserting or removing pages from a list. As can be seen in FIG. 6A, an odd page is required resulting in the removal of page number 306 from the list. Forward pointer 302b and backward pointer 304a are removed with forward pointer 302a pointing from anchor 300 to page number 308 and backward pointer 304b pointing from page number 308 to anchor 300. In the event that an even page is required, the page number is removed from the end of the list as illustrated in FIG. 6B. Page number 312 is removed and forward pointer 302e and backward pointer 304d are removed. Forward pointer 302d is altered to point from page number 310 to anchor 300 while backward pointer 304e is changed to point from anchor 300 to page number 310.

Figure 7:
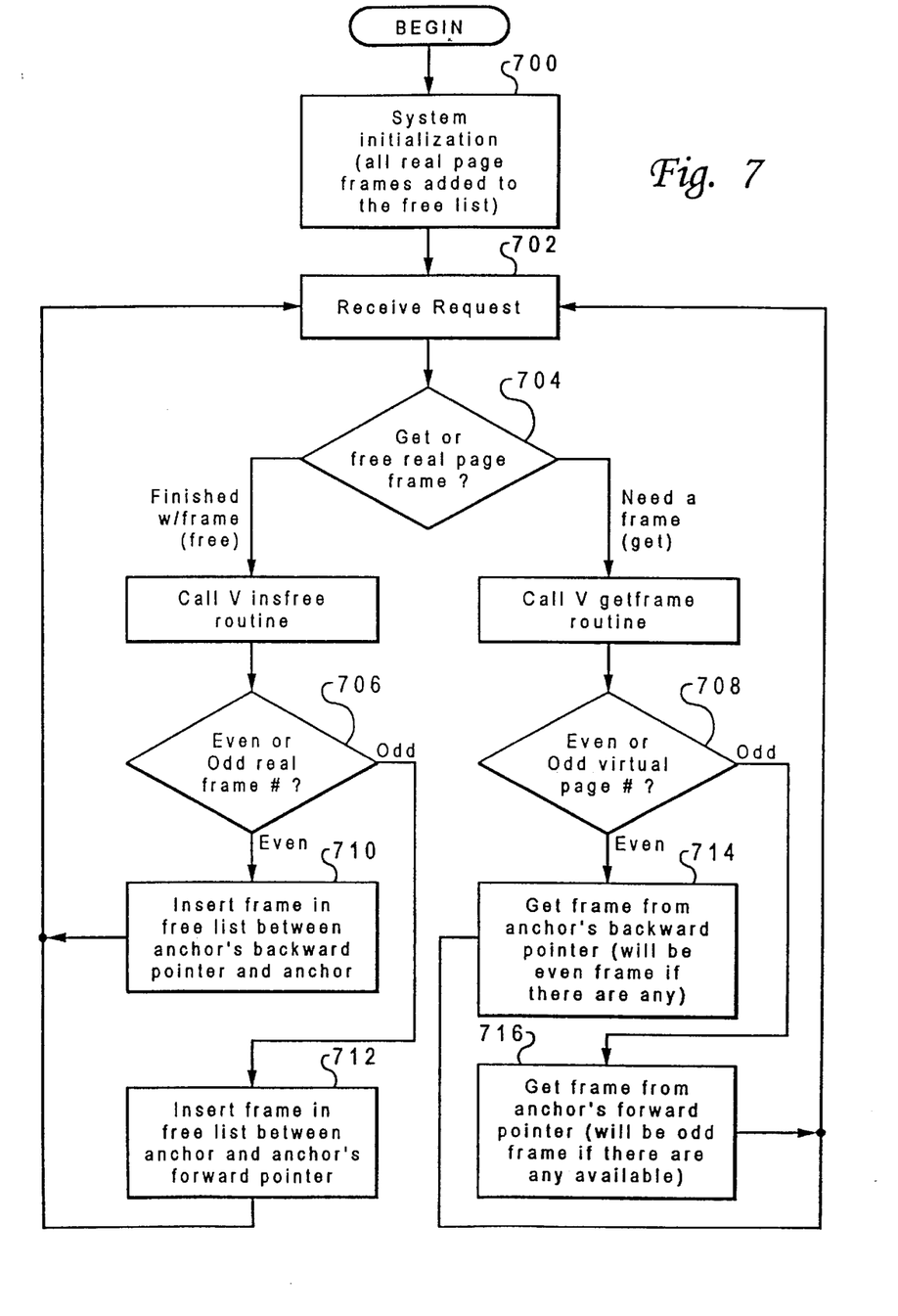
FIG. 7 is a flowchart of a process for inserting and removing pages from a free list in accordance with a preferred embodiment of the present invention.

With reference now to FIG. 7, a flowchart of a process for inserting and removing pages from a free list is depicted in accordance with a preferred embodiment of the present invention. The process begins with system initialization in which all real pages are added to the free list (step 700). Thereafter, a request is received (step 702). A determination is made as to whether the request is to get a real page or to free a real page from the cache. In response to a request to free a real page, the process determines whether the page to be freed is an even or odd real page number (step 706). If the page number is an even real page number, the process inserts the page in the free list between the anchor's backward pointer and the anchor (step 710). If the page number is an odd real page number, the process inserts the page in the free list between the anchor and the anchor's forward pointer (step 712). In both cases, the process returns to step 702 to receive a request. With reference again to step 704, if the request is to get a free page to assign to a virgual page, the process then determines whether the page is an even or odd virtual page number (step 708). If the page number is for an even virtual page number, the process obtains the page from the anchor's backward pointer (step 714) with the process then returning to step 702. In step 708, if the requested page is for an odd virtual page number, the process obtains the page from the anchor's forward pointer (step 716). The page will be an odd page if any odd pages are available. Thereafter, the process returns to step 702.

The following is a list of data structures and pseudo code in accordance with a preferred embodiment of the present invention. The pseudo code is in C language.

```
/* Data structures
*
* A virtual address consists of a segment id (sid) and page number (pno).
* A sid is 28 bits and a pno is 16. A real address is 32 bits.
* A page is 4096 bytes.
*
* The page frame table (pft) maps the real page frames to the virtual
* pages they are assigned to. For each real page frame there is a pftsw
* structure.
*
* Real page frame number 1 (nfr = FBANCH) is the anchor for the list
* of free frames. This frame is always present. When the free list
* is empty, pft_freefwd(FBANCH) == pft_freebwd(FBANCH) == FBANCH.
*/
struct pftsw
{
    int     _ssid;      /* segment id of source object   (sid)*/
    uint    _pagex;        /* page number in source object (pno)*/
    int     _freefwd;  /* next on free list */
    int     _freebwd;  /* previous on free list */
    . . .
};
struct vmmdseg
{
    struct pftsw    pft[MAXRPAGE];       /* software defined pft */
    . . .
};
struct vmmdseg vmmdseg;
#define     pft_freefwd(x)       vmmdseg.pft[(x)]._freefwd
#define     pft_freebwd(x)       vmmdseg.pft[(x)]._freebwd
#define     pft_ssid(x)      vmmdseg.pft[(x)]._ssid
#define     pft_pagex(x)     vmmdseg.pft[(x)]._pagex
/*
* PFT index of free block anchor.
*/
#define FBANCH        1      /* pft anchor for free list */
/*
* List management routines
*
* v_insfree() is called to insert a real page frame
```

```
* (real page frame number = nfr) on the free list.
* Odd frame numbers are put at the front of the forward list,
* even frame numbers are put at the front of the backward list.
*
*
* v_getframe() is called to allocate a real page frame
* from the free list. An odd real page frame number (nfr) is assigned
* to an odd virtual page number (pno) and an even real page frame number
* is assigned to an even virtual page number. An odd real page frame
* is pulled from the forward pointer of FBANCH and an even real page
* frame is pulled from the backward pointer of FBANCH.
*
* This odd/odd, even/even assignment is not guaranteed. If there are
* only even frame numbers available, then an even frame will be assigned
* to an odd virtual page number.
*/
/*
* v_insfree
* put page frame on free list
*/
v_insfree(nfr)
int nfr;       /* page frame number to put on free list */
{
    int nxt,prv;
    /*
    * put at head if odd, tail if even frame
    */
    if (nfr & 1)
    {
        prv = FBANCH;
        nxt = pft_freefwd(FBANCH);
    }
    else
    {
        prv = pft_freebwd(FBANCH)
        nxt = FBANCH;
    }
    pft_freefwd(nfr) = nxt;
    pft_freebwd(nxt) = nfr;
    pft_freebwd(nfr) = prv;
    pft_freefwd(prv) = nfr;
        return 0;
}
/*
* v_getframe(sid,page)
*
* on entry the free frame list is not empty. this
* procedure takes the first frame off the free list
* and returns its page frame number.
*
* input parameters
*       sid - segment id
*       page - page within sid.
*
* RETURN VALUE - page frame allocated.
*/
int
v_getframe(sid,page)
int sid;
int page;
{
    int nfr,nxt,sidx,prv;
    struct ppda* p_ppda;
    /* remove a frame from the appropriate end
    * of the list. If odd use forward pointer
    * else (even) use backward pointer.
    */
    if (page & 1)
    {
        nfr = pft_freefwd(FBANCH);
        prv = FBANCH;
        nxt = pft_freefwd(pft_freefwd(FBANCH));
    }
    else
    {
        nfr = pft_freebwd(FBANCH);
        prv = pft_freebwd(pft_freebwd(FBANCH));
        nxt = FBANCH;
    }
    pft_freefwd(prv) = nxt;
```

-continued

```
        pft_freebwd(nxt) = prv;
        return (nfr);
}
```

It is important to note that while the present invention has been described in the context of a fully functional set of data processing systems, those skilled in the art will appreciate that the mechanisms of the present invention are capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for handling real and virtual pages in a data processing system utilizing a cache, wherein the cache contains a first memory and a second memory for storing pages, the method comprising:
   creating a list of free real pages, wherein free real pages in the list are sequentially associated with one another with a first page and a last page in the list being associated with an anchor page;
   receiving a request for a real page to be assigned to a virtual page;
   identifying whether the virtual page is an even virtual page;
   assigning a real page using the last real page in the list in response to a determination that the virtual page is an even virtual page; and
   assigning a real page using the first real page in the list in response to a determination that the virtual page is an odd virtual page.

2. A method for handling real and virtual pages in a data processing system utilizing a cache, wherein the cache contains a first memory and a second memory for storing pages, the method comprising:
   creating a list of free real pages, wherein free real pages in the list are sequentially associated with one another with a first page and a last page in the list being associated with an anchor page;
   receiving a request for a real page to be assigned to a virtual page;
   identifying whether the virtual page is an even virtual page;
   assigning a real page using the last real page in the list in response to a determination that the virtual page is an even virtual page;
   assigning a real page using the first real page in the list in response to a determination that the virtual page is an odd virtual page; and
   linking a new last page to the anchor page in response to assigning the last page in response to the request, wherein the new last page is a page associated with the last page.

3. A method for handling real and virtual pages in a data processing system utilizing a cache, wherein the cache contains a first memory and a second memory for storing pages, the method comprising:
   creating a list of free real pages, wherein free real pages in the list are sequentially associated with one another with a first page and a last page in the list being associated with an anchor page;
   receiving a request for a real page to be assigned to a virtual page;
   identifying whether the virtual page is an even virtual page;
   assigning a real page using the last real page in the list in response to a determination that the virtual page is an even virtual page;
   assigning a real page using the first real page in the list in response to a determination that the virtual page is an odd virtual page; and
   linking a new first page to the anchor page in response to assigning the first page in response to the request, wherein the new first page is a page associated to the first page.

4. The method of claim 1 further comprising:
   receiving a request to release a real page;
   identifying whether the real page is an even real page;
   inserting the page number in the list between the last page and the anchor in response to a determination that the real page is an even real page; and
   inserting the real page between the first page and the anchor page in response to a determination that the real page is an odd real page.

5. The method of claim 1, wherein the pages are associated with each other by a plurality of forward pointers and a plurality of backward pointers, wherein each page within the list of free pages are connected to another page by one of the plurality of forward pointers and by one of the plurality of backward pointers, the anchor page connected to the first page in the list by the first pointer within the plurality of forward pointers and by the last pointer in the plurality of backward pointers, and the last page in the list is connected to the anchor page by the last of the plurality of forward pointers and the first of the plurality of backward pointers.

6. An apparatus for handling real and virtual pages in a data processing system utilizing a cache, wherein the cache contains a first memory and a second memory for storing pages, the apparatus comprising;
   creation means for creating a list of free real pages, wherein free real pages in the list are sequentially associated with one another with a first page and a last page in the list being associated with an anchor page;
   reception means for receiving a request for a real page to be assigned to a virtual page;
   identification means for identifying whether the virtual page is an even virtual page;

first assignment means for assigning a real page using the last real page in the list in response to a determination that the virtual page is an even virtual page; and second assignment means for assigning a real page using the first real page in the list in response to a determination that the virtual page is an odd virtual page.

7. An apparatus for handling real and virtual pages in a data processing system utilizing a cache, wherein the cache contains a first memory and a second memory for storing pages, the apparatus comprising:

creation means for creating a list of free real pages, wherein free real pages in the list are sequentially associated with one another with a first page and a last page in the list being associated with an anchor page;

reception means for receiving a request for a real page to be assigned to a virtual page;

identification means for identifying whether the virtual page is an even virtual page;

first assignment means for assigning a real page using the last real page in the list in response to a determination that the virtual page is an even virtual page, second assignment means for assigning a real page using the first real page in the list in response to a determination that the virtual page is an odd virtual page; and linking means for linking a new last page to the anchor page in response to the first assignment means assigning the last page, wherein the new last page is a page associated with the last page.

8. An apparatus for handling real and virtual pages in a data processing system utilizing a cache, wherein the cache contains a first memory and a second memory for storing pages the apparatus comprising:

creation means for creating a list of free real pages, wherein free real pages in the list are sequentially associated with one another with a first page and a last page in the list being associated with an anchor page;

reception means for receiving a request for a real page to be assigned to a virtual page;

identification means for identifying whether the virtual page is an even virtual page;

first assignment means for assigning a real page using the last real page in the list in response to a determination that the virtual page is an even virtual page; second assignment means for assigning a real page using the first real page in the list in response to a determination that the virtual page is an odd virtual page; and linking means for linking a new first page to the anchor page in response to assigning the first page, wherein the new first page is a page associated with the first page.

9. The apparatus of claim 6 further comprising:

second reception means for receiving a request to release a real page;

second identification means for identifying whether the real page is an even page;

first insertion means for inserting the page number in the list between the last page and the anchor in response to a determination that the real page is an even real page; and second insertion means for inserting the real page between the first page and the anchor page in response to a determination that the real page is an odd real page.

10. The apparatus of claim 6, wherein the pages are associated with each other by a plurality of forward pointers and a plurality of backward pointers, wherein each page within the list of free pages are connected to another page by one of the plurality of forward pointers and by one of the plurality of backward pointers, the anchor page connected to the first page in the list by the first pointer within the plurality of forward pointers and by the last pointer in the plurality of backward pointers, and the last page in the list is connected to the anchor page by the last of the plurality of forward pointers and the first of the plurality of backward pointers.

11. A computer readable media including instructions for handling real and virtual pages in a data processing system, comprising:

instructions for creating a real list of pages, wherein the free real pages in the list are sequentially associated with one another with a first page and a last page in the list being associated with an anchor page;

instructions for receiving a request for a real page to be assigned to a virtual page;

instructions for identifying whether the virtual page is an even virtual page;

instructions for assigning a real page using the last real in the list in response to a determination that the virtual page is an even virtual page; and instructions for assigning a real page using the first real page in the list in response to a determination that the virtual page is an odd virtual page.

12. The computer readable media of claim 11, wherein the computer readable media is a floppy disk.

13. The computer readable media of claim 11, wherein the computer readable media is a CD-ROM.

* * * * *